United States Patent
Ujii et al.

(10) Patent No.: US 8,878,805 B2
(45) Date of Patent: *Nov. 4, 2014

(54) TOUCH PANEL VIBRATOR WITH REDUCED REFLECTANCE

(75) Inventors: Junichi Ujii, Nakano-ku (JP); Kouji Tsurusaki, Kirishima (JP)

(73) Assignee: Kyocera Corporation, Kyoto (JP)

( * ) Notice: Subject to any disclaimer, the term of this patent is extended or adjusted under 35 U.S.C. 154(b) by 158 days.

This patent is subject to a terminal disclaimer.

(21) Appl. No.: 13/695,049

(22) PCT Filed: Nov. 8, 2011

(86) PCT No.: PCT/JP2011/075660
§ 371 (c)(1),
(2), (4) Date: Oct. 29, 2012

(87) PCT Pub. No.: WO2012/070378
PCT Pub. Date: May 31, 2012

(65) Prior Publication Data
US 2013/0038561 A1    Feb. 14, 2013

(30) Foreign Application Priority Data

Nov. 26, 2010 (JP) .................................. 2010-263833

(51) Int. Cl.
*G06F 3/041* (2006.01)
*H04M 1/02* (2006.01)

(52) U.S. Cl.
CPC ...... *G06F 3/041* (2013.01); *H04M 1/02* (2013.01)
USPC ........................................................ 345/173

(58) Field of Classification Search
CPC ...................................................... G06F 3/016
USPC .................................................. 345/173–183
See application file for complete search history.

(56) References Cited

U.S. PATENT DOCUMENTS 7,215,329 B2    5/2007  Yoshikawa et al.
2005/0253643 A1*  11/2005  Inokawa et al. ............... 327/517
(Continued)

FOREIGN PATENT DOCUMENTS

JP    2003-122507 A    4/2003
JP    2008276729 A    11/2008
(Continued)

OTHER PUBLICATIONS

International Search Report, PCT/JP2011/075660, Nov. 30, 2011.

*Primary Examiner* — Gene W Lee
(74) *Attorney, Agent, or Firm* — Volpe and Koenig, P.C.

(57) ABSTRACT

An electronic device includes a touch panel; a light shielding film formed on a first principal surface of a touch panel corresponding to a non-operation area; and a vibrator provided on a second principal surface of the touch panel corresponding to the non-operation area. When a critical angle at which light is totally reflected by the second principal surface of the touch panel is θ and sum of a thickness T1 of the touch panel and a thickness T2 of the vibrator is T, the vibrator is positioned, in sectional view, within a range of T×tan θ from an end on the operation area side of the light shielding film on the second principal surface of the touch panel corresponding to the non-operation area, and a reflection-reducing film having a reflectance lower than a reflectance of a surface of the vibrator is provided on the surface of the vibrator positioned within the range of T×tan θ from the end on the operation area side of the light shielding film.

13 Claims, 7 Drawing Sheets

(56) References Cited

U.S. PATENT DOCUMENTS

| | | |
|---|---|---|
| 2006/0050059 A1* | 3/2006 | Satoh et al. ............. 345/173 |
| 2007/0146334 A1* | 6/2007 | Inokawa ............... 345/173 |
| 2008/0246741 A1 | 10/2008 | Hinata |
| 2009/0122020 A1* | 5/2009 | Eliasson et al. ........... 345/173 |
| 2010/0123671 A1* | 5/2010 | Lee ..................... 345/173 |
| 2011/0050596 A1* | 3/2011 | Park et al. .............. 345/173 |
| 2011/0050597 A1* | 3/2011 | Park et al. .............. 345/173 |
| 2011/0298741 A1 | 12/2011 | Sakai et al. |
| 2013/0038558 A1* | 2/2013 | Ujii et al. ............... 345/173 |
| 2014/0132532 A1* | 5/2014 | Yairi et al. .............. 345/173 |

FOREIGN PATENT DOCUMENTS

| | | |
|---|---|---|
| JP | 2009128520 A | 6/2009 |
| WO | 2010095733 A | 8/2010 |

* cited by examiner

TOUCH PANEL VIBRATOR WITH REDUCED REFLECTANCE

FIELD OF INVENTION

The present invention relates to an electronic device and a mobile terminal including the same.

BACKGROUND

In recent years, there is known a tactile transmission technique to transmit various tactile senses such as a sense of pressing, a sense of tracing, or a sense of texture to a user when the user operates a touch panel in an electronic device including a touch panel (for example, see Patent Literature 1).

An electronic device to which such a tactile transmission technique is applied includes a display panel; a touch panel disposed to be opposed to the display panel with a space interposed therebetween; a vibrator provided on a rear surface of the touch panel; and a base that supports the touch panel. The electronic device can transmit various tactile senses to the user by causing flexural vibration of the touch panel according to expansion and contraction motions of the vibrator.

In the electronic device described above, however, the touch panel is disposed to be opposed to the display panel with a space interposed therebetween. Accordingly, when a user looks into the electronic device from an oblique direction, for example, there is a possibility that the vibrator provided on the rear surface of the touch panel is visually observed by the user. In this case, reflection of externally incident light on a surface of the vibrator may give a sense of discomfort, such as glare, to the user.

To prevent a sense of discomfort, such as glare, from being given to a user, it is necessary to dispose a vibrator at a position where the vibrator is not visually observed by a user even when the user looks into the electronic device from an oblique direction. In this mode, however, a non-operation area of the electronic device increases, which results in an increase in size in a lateral direction of the electronic device.

CITATION LIST

Patent Literature

Patent Literature 1: Japanese Laid-open Patent Publication No. 2003-122507

SUMMARY

Technical Problem

The present invention has been made in view of the above-mentioned problem, and it is an object of the present invention to provide an electronic device capable of reducing a possibility of giving a sense of discomfort, such as glare, to a user, while making it possible to achieve downsizing, and a mobile terminal including the same.

An aspect of an electronic device according to the present invention is an electronic device including an operation area and a non-operation area positioned outside the operation area, the electronic device including: an operation unit including a first principal surface and a second principal surface positioned opposite to the first principal surface; a light shielding film formed on the first principal surface of the operation unit corresponding to the non-operation area; and a vibrator provided on the second principal surface of the operation unit corresponding to the non-operation area, wherein when a critical angle at which light is totally reflected by the second principal surface of the operation unit is represented by $\theta$ and sum of a thickness T1 of the operation unit and a thickness T2 of the vibrator is represented by T, the vibrator is positioned, in sectional view, within a range of T×tan $\theta$ from an end on the operation area side of the light shielding film on the second principal surface of the operation unit corresponding to the non-operation area, and a reflection-reducing film having a reflectance lower than a reflectance of a surface of the vibrator is provided on the surface of the vibrator positioned within the range of T×tan $\theta$ from the end on the operation area side of the light shielding film.

According to an aspect of a mobile terminal according to the present invention, the electronic device according to the present invention is provided in a housing.

DETAILED DESCRIPTION OF THE PREFERRED EMBODIMENTS

Figure 1:
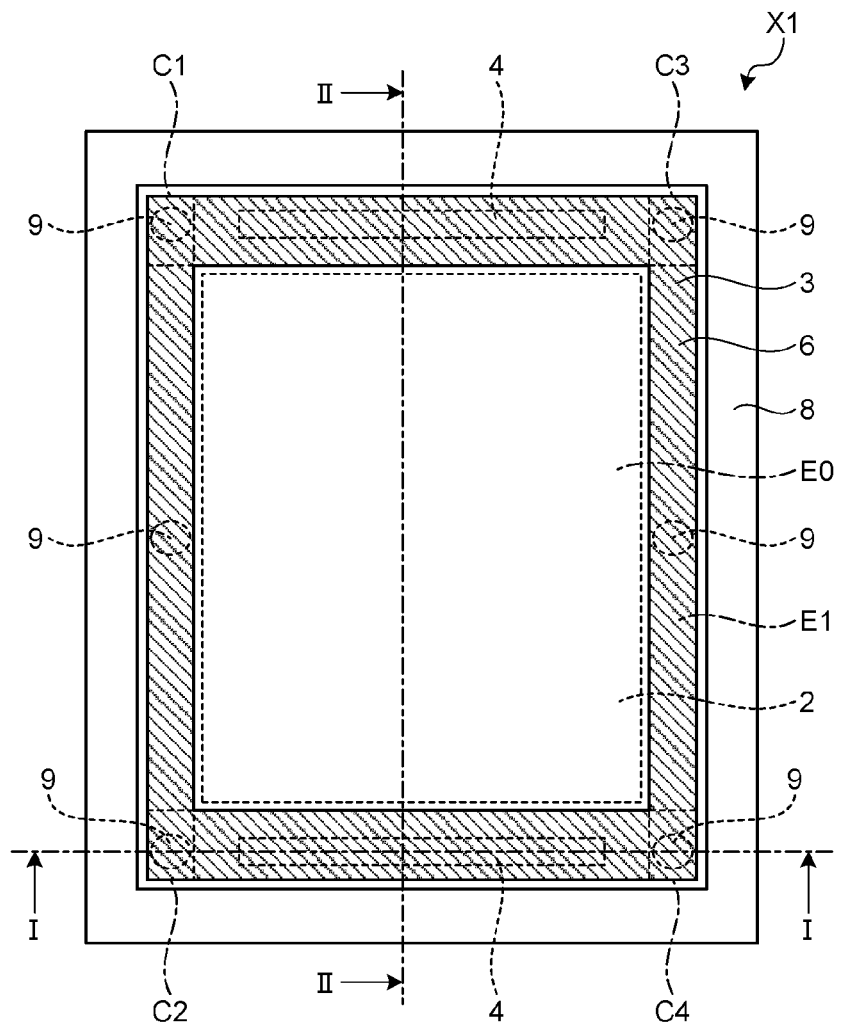
FIG. 1 is a plan view illustrating a schematic configuration of an electronic device according to a first embodiment of the present invention.

Hereinafter, embodiments of the present invention will be described with reference to the drawings. Note that in the drawings to be referred to hereinafter, primary members necessary to describe the present invention, among components according to an embodiment of the present invention, are illustrated in a simplified manner, for convenience of explanation. Accordingly, an electronic device according to the present invention and a mobile terminal including the same may include other components that are not illustrated in the drawings to be referred to herein.

First Embodiment

Figure 2:
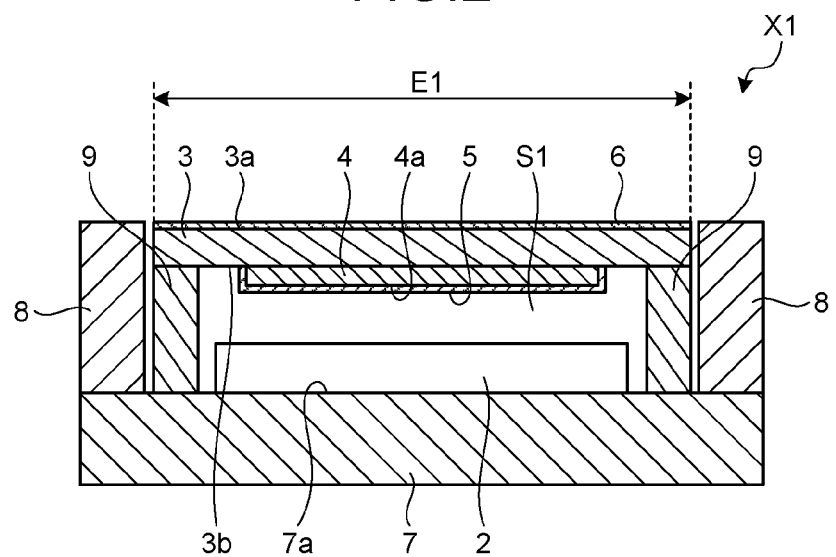
FIG. 2 is a sectional view taken along a cutting-plane line I-I illustrated in FIG. 1.
Figure 3:
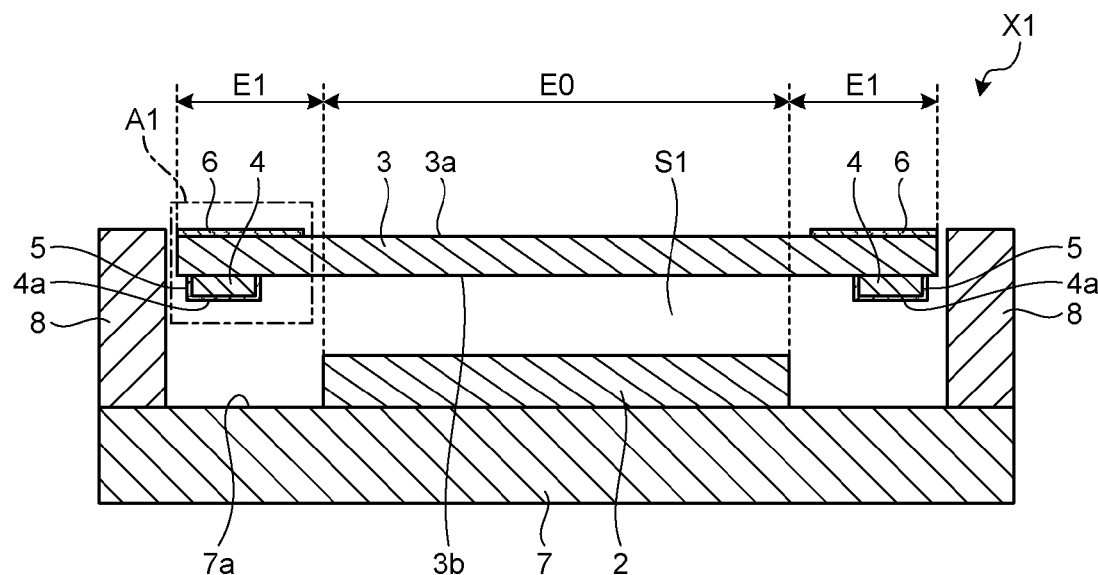
FIG. 3 is a sectional view taken along a cutting-plane line II-II illustrated in FIG. 1.

As illustrated in FIGS. 1 to 3, an electronic device X1 according to this embodiment includes an operation area E0 and a non-operation area E1 which is located outside the operation area E0. The operation area E0 is an area in which a user can perform an input operation. The non-operation area E1 is an area in which a user cannot perform an input operation.

The electronic device X1 includes a liquid crystal panel 2, a touch panel 3, a vibrator 4, a reflection-reducing film 5, a light shielding film 6, a base substance 7, a frame body 8, and a base 9.

The liquid crystal panel 2 is a display panel using a liquid crystal composition for display. Specifically, the liquid crystal panel 2 includes one substrate; the other substrate disposed to be opposed to the one substrate; a liquid crystal layer interposed between the one substrate and the other substrate; a display member layer that is interposed between the one substrate and the other substrate and contributes to display; and a backlight that irradiates light to the one substrate and the other substrate. Herein, for convenience of explanation, illustration of each of the one substrate, the other substrate, the liquid crystal layer, the display member layer, and the backlight is herein omitted. Note that examples of the display member layer include a pixel electrode, an alignment film, and a color filter. As a drive system of the liquid crystal panel 2, a simple matrix drive system or an active matrix drive system may be employed.

Note that a display panel, such as a plasma panel, an organic EL panel, or electronic paper, may be used instead of the liquid crystal panel 2. The organic EL panel is a display panel incorporating a substance that emits light upon application of a voltage. Specifically, the organic EL panel performs display by depositing a luminous body using an organic substance, such as diamines, onto a substrate and applying a DC voltage of 5 to 10 V. In a case of using the organic EL panel instead of the liquid crystal panel 2, there is no need to provide a backlight.

The touch panel (operation unit) 3 is an input device that detects a location where a user operates with a finger, a pen, or the like, as an input position. The touch panel 3 has a first principal surface 3a and a second principal surface 3b positioned opposite to the first principal surface 3a. In other words, the first principal surface 3a of the touch panel 3 corresponding to the operation area E0 serves as a surface on which a user directly operates with a finger, a pen, or the like. As illustrated in FIGS. 2 and 3, the touch panel 3 is disposed to be opposed to the liquid crystal panel 2 with a space 51 interposed therebetween. As illustrated in FIG. 1, the touch panel 3 has a rectangular shape in plane view. However, a shape of the touch panel 3 is not limited thereto, and any shape may be used.

In this embodiment, a capacitive touch panel is used as the touch panel 3 in terms of improvement in detection sensitivity. Alternatively, a resistive touch panel, a surface acoustic wave touch panel, an infrared touch panel, an electromagnetic induction type touch panel, or the like may be used instead of the capacitive touch panel. In this embodiment, the touch panel 3, which is a capacitive touch panel, includes a base substance; a detection electrode that is provided on the base substance and detects an input position; and a detection electrode wiring that is provided on the base substance and electrically connected to the detection electrode. Examples of material of the base substance include glass, plastic, and acryl.

Herein, the touch panel 3 may be in a state of including a protective member to protect the touch panel 3, or may be in a state of including no protective member. When the touch panel 3 is in the state of including the protective member, the first principal surface 3a of the touch panel 3 may mean an upper surface of the protective member, or may mean an upper surface of the base substance forming the touch panel 3 in the state of including no protective member. The second principal surface 3b of the touch panel 3 may mean a lower surface of the base substance forming the touch panel 3, or may mean a lower surface of an insulating film formed on the lower surface of the base substance forming the touch panel 3.

When the touch panel 3 is a resistive touch panel including an upper substrate; a first resistance film formed on the upper substrate; a lower substrate disposed to be opposed to the upper substrate; and a second resistance film formed on the lower substrate, the first principal surface 3a of the touch panel 3 means an upper surface of the upper substrate. The second principal surface 3b of the touch panel 3 means a lower surface of the lower substrate. The term "operation unit" herein described may mean only the lower substrate of the resistive touch panel. In this case, the term "the first principal surface of the operation unit" means an upper surface of the lower substrate, and the term "the second principal surface of the operation unit" means a lower surface of the lower substrate.

The vibrator 4 is a member that serves to cause flexural vibration of the touch panel 3, upon detecting a predetermined input operation by a user. Specifically, the vibrator 4 repeats expansion and contraction motions in a short-side direction of the touch panel 3 (a left and right direction in FIG. 1), thereby causing flexural vibration of the touch panel 3 in a thickness direction of the touch panel 3 (this direction is hereinafter referred to as a "vertical direction"). Note that as described in detail later, the vibrator 4 also serves to detect a pressing load onto the touch panel 3. The vibrator 4 is provided on the second principal surface 3b of the touch panel 3 corresponding to the non-operation area E1, with an adhesive member, which is not illustrated, interposed therebetween. In this embodiment, the vibrator 4 is a piezoelectric element that performs expansion and contraction motions based on an applied voltage, for example, but a configuration of the vibrator 4 is not limited thereto. An electromagnetic vibrator, a spring, a motor, or the like may be used instead of the piezoelectric element.

In this embodiment, the vibrator 4, which is a piezoelectric element, has a following configuration. That is, the vibrator 4 has a substantially rectangular parallel-piped shape, and has a configuration in which an electrode and an active layer are alternately stacked and an inert layer is formed on an active layer positioned near the second principal surface 3b of the touch panel 3. Herein, the active layer is made of a polarized piezoelectric material. The inert layer is formed of a non-polarized piezoelectric material, a metallic material, or an insulating material.

In this embodiment, as illustrated in FIG. 1, the vibrator 4 consists of two vibrators that are respectively provided along both short sides of the touch panel 3 and in the vicinity of the both short sides. Note that a layout position, number, and the like of the vibrator 4 are not particularly limited. For example, the vibrator 4 may consist of two vibrators that are respectively provided along both long sides of the touch panel 3 and in the vicinity of the both long sides, or four vibrators that are respectively provided along the long sides and the short sides of the touch panel 3 and in the vicinity of the both long sides and the both short sides.

The reflection-reducing film 5 is a member that serves to reduce reflection of light. In this embodiment, the reflection-reducing film 5 is formed over the whole of a surface 4a of the vibrator 4. The reflection-reducing film 5 has a reflectance lower than that of the vibrator 4. Note that the reflectance is a numerical value representing a ratio between reflected light energy and incident light energy in percentage, when light is perpendicularly incident on a surface of an object in a vacuum. The reflectance can be measured by a well-known reflectance measurement device. The reflection-reducing film 5 is formed by printing a black pigment on the surface 4a of the vibrator 4, or coating a black mat paint on the surface 4a of the vibrator 4, for example. Note that the mat paint generates micro-irregularities on the surface of a paint film by adding a matting agent (for example, fine powder silica or polyethylene fine powder) to a paint, and reduces gross by irregular reflection of light. The reflection-reducing film 5 is preferably black, because the reflection-reducing film 5 serves to reduce reflection of light.

The light shielding film 6 is a member having a light shielding property to shield light. The light shielding film 6 is formed by printing a black pigment on the first principal surface 3a of the touch panel 3, for example. Instead of this, tape having a light shielding property may be used as the light shielding film 6. The light shielding film 6 is provided on the first principal surface 3a of the touch panel 3 corresponding to the non-operation area E1. In this embodiment, as illustrated in FIG. 1, the light shielding film 6 is provided in a frame shape so as to surround the liquid crystal panel 2 in plan view.

Figure 4:
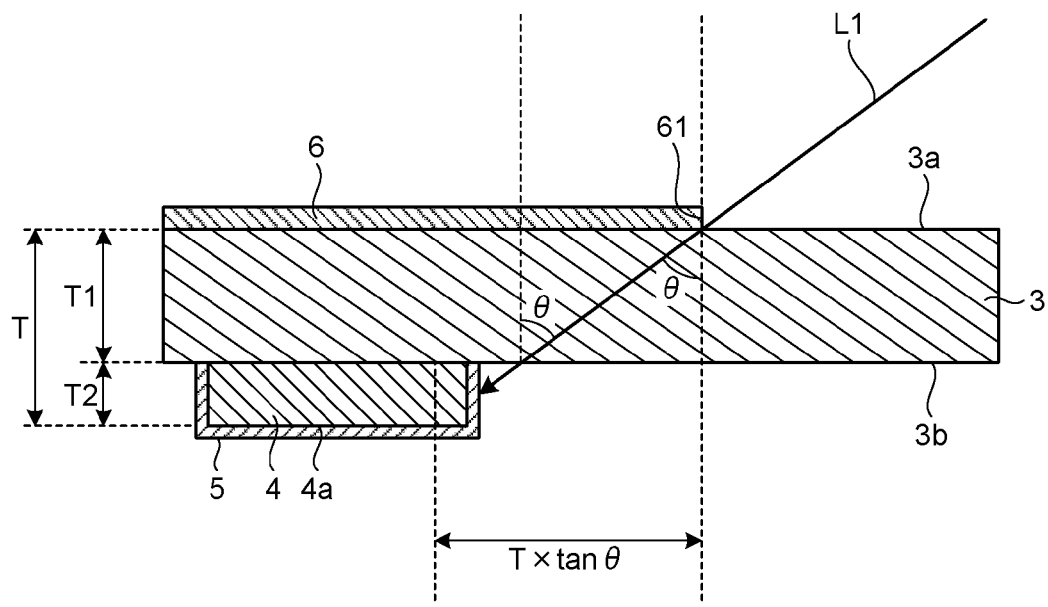
FIG. 4 is an enlarged view of a portion A1 illustrated in FIG. 3.

A layout position of the vibrator 4 relative to the light shielding film 5 will now be described. FIG. 4 is an enlarged view of a portion A1 illustrated in FIG. 3. First, as illustrated in FIG. 4, assume that a critical angle at which light is totally reflected by the second principal surface 3b of the touch panel 3 is represented by $\theta$ and the sum of a thickness T1 of the touch panel 3 and a thickness T2 of the vibrator 4 is represented by T. Note that this total reflection means that incident all light is reflected without passing through an interface when light enters a medium having a small refractive index from a medium having a large refractive index. The total reflection occurs when an angle of incidence is a certain angle (critical angle) or more. In this embodiment, a base substance of the touch panel 3 is glass, plastic, or acryl. Accordingly, the total reflection occurs at the second principal surface 3b of the touch panel 3 when an angle of incidence is a critical angle of $\theta$ or more. This is because a refractive index of air is about 1, whereas a refractive index of glass is about 1.5 to 1.9; a refractive index of plastic is about 1.5 to 1.7; and a refractive index of acryl is about 1.4 to 1.5. The critical angle $\theta$ of glass is about 42° and the critical angle $\theta$ of acryl is also about 42°.

Specifically, if assuming that L1 in FIG. 4 represents a visual line direction (incident light) of a user, when the visual line direction L1 of the user corresponds to being equal to or greater than the critical angle $\theta$, total reflection occurs at the second principal surface 3b of the touch panel 3. This makes it difficult to visually observe the vibrator 4 provided on the second principal surface 3b of the touch panel 3. On the other hand, when the visual line direction L1 of the user is less than the critical angle $\theta$, the vibrator 4 provided on the second principal surface 3b of the touch panel 3 is visually observed due to its layout position. That is, when the visual line direction L1 of the user is less than the critical angle $\theta$, it is important to devise a layout position of the vibrator 4 so as to prevent the vibrator 4 from being visually observed.

Specifically, when at least a part of the vibrator 4 is positioned within a range of T×tan $\theta$ from an end 61 on the operation area E0 side of the light shielding film 6 on the second principal surface 3b of the touch panel 3 corresponding to the non-operation area E1, a user can visually observe the vibrator 4. When the vibrator 4 is visually observed by a user, reflection of externally incident light by the surface 4a of the vibrator 4 may give a sense of discomfort, such as flare, to the user. On the other hand, when the vibrator 4 is located at a position apart by T×tan $\theta$ or more from the end 61 on the operation area E0 side of the light shielding film 6 on the second principal surface 3b of the touch panel 3 corresponding to the non-operation area E1, a user cannot visually observe the vibrator 4.

Thus, to prevent a sense of discomfort, such as glare, from being given to a user, the vibrator 4 is desirably located at a position apart by T×tan $\theta$ or more from the end 61 on the operation area E0 side of the light shielding film 6. In this mode, however, the non-operation area E1 of the electronic device X1 increases, which results in an increase in size in a lateral direction of the electronic device X1.

Accordingly, in the electronic device X1 according to this embodiment, at least a part of the vibrator 4 is positioned within the range of T×tan $\theta$ from the end 61 on the operation area E0 side of the light shielding film 6, and the reflection-reducing film 5 having a reflectance lower than a reflectance of the surface 4a is provided on the surface 4a of the vibrator 4. With this configuration, reflection the externally incident light is reduced in the reflection-reducing film 5, thereby preventing a sense of discomfort, such as glare, from being given to a user. Further, in the electronic device X1, at least a part of the vibrator 4 is positioned within the range of T×tan $\theta$ from the end 61 on the operation area E0 side of the light shielding film 6, thereby making it possible to achieve downsizing.

Note that this embodiment illustrates an example in which the reflection-reducing film 5 is provided over the whole of the surface 4a of the vibrator 4, but the present invention is not limited thereto. For example, the reflection-reducing film 5 may be provided on a part of the surface 4a of the vibrator 4. Specifically, the reflection-reducing film 5 may be provided only on a part of the surface 4a which part is in the range of T×tan $\theta$ from the end 61 on the operation area E0 side of the light shielding film 6.

The base substance 7 and the frame body 8 are members that serve to house the liquid crystal panel 2. The base substance 7 includes a third principal surface 7a. A liquid crystal panel 2 is provided on or above the third principal surface 7a of the base substance 7. As illustrated in FIG. 1, the frame body 8 is provided on the third principal surface 7a of the base substance 7 so as to surround the liquid crystal panel 2 in plan view. Examples of material of the base substance 7 and the frame body 8 include resin such as polycarbonate and metal such as stainless, aluminum or magnesium alloy. The base substance 7 and the frame body 8 may be integrally formed, or may be separately formed.

The base 9 is a member that serves to support the touch panel 3 at the non-operation area E1. The base 9 is provided on the third principal surface 7a of the base substance 7. In this embodiment, the base 9 are located at six positions in total, i.e., at four corners C1 to C4 of the touch panel 3, at a location between the corners C1 and C2, and at a location between the corners C3 and C4. A shape of the base 9 is a cylindrical shape, for example, but may be a rectangular columnar shape or the like. Examples of material of the base 9 include silicone rubber, urethane rubber, urethane foam, other rubbers, and plastic.

Next, an operation example of the electronic device X1 will be described with reference to FIG. 5.

Note that an operation example of the electronic device X1 when a sense of pressing is transmitted to a user as tactile transmission will be described below. However, the electronic device X1 is applicable to a case where various tactile senses, such as a sense of tracing or texture feeling, in addition to the sense of pressing are transmitted.

Figure 5:
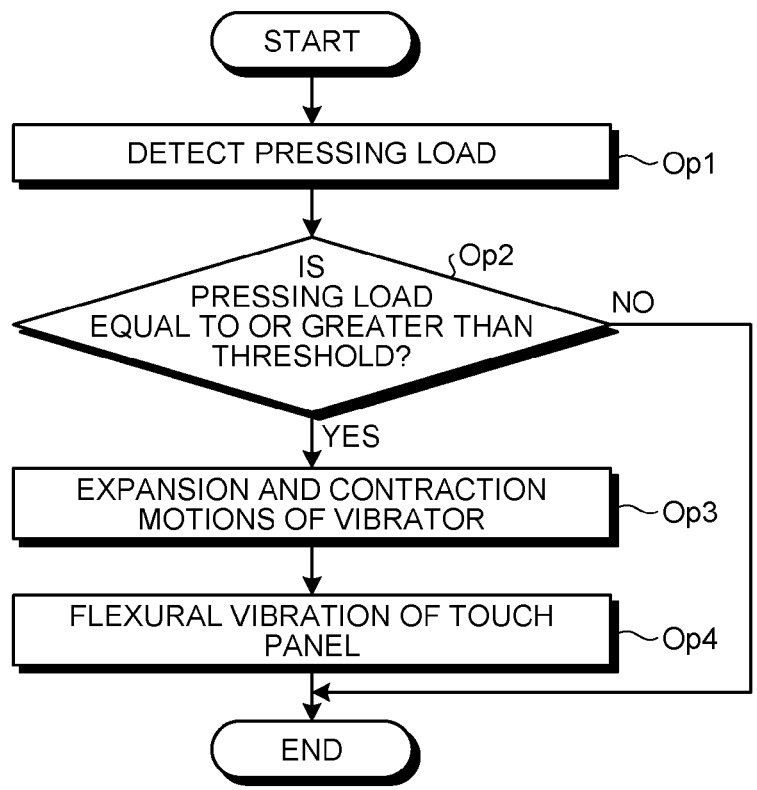
FIG. 5 is a flowchart illustrating an operation example of the electronic device.

As illustrated in FIG. 5, when a user presses the first principal surface 3a of the touch panel 3, the vibrator 4 detects a pressing load onto the touch panel 3 (Op1). A load detection function of the vibrator 4 will now be described. That is, when a user presses the first principal surface 3a of the touch panel 3, the touch panel 3 is curved downward. When the touch panel 3 is curved downward, the vibrator 4 is also curved downward. In other words, amount of curvature of the vibrator 4 varies depending on a pressing load onto the first principal surface 3a of the touch panel 3. In this embodiment, since the vibrator 4 is a piezoelectric element, the vibrator 4 can perform conversion to a voltage depending on the amount of curvature. As a result, the vibrator 4 can detect the pressing load onto the touch panel 3. Note that an example in which the load detection function is implemented by the vibrator 4 has been described above, but the present invention is not limited thereto. The load detection function may be implemented by a load sensor such as a distortion sensor.

Then, when an input operation by a user is a pressing operation on an input object displayed on a display screen, a tactile transmission driver, which is not illustrated, determines whether the pressing load detected in Op1 is equal to or greater than a threshold (Op2). Note that the tactile transmission driver is provided on an FPC (Flexible Printed Circuit) connected to the touch panel 3, together with a touch panel driver that controls the touch panel 3, for example.

When determining that the pressing load detected in Op1 is equal to or greater than the threshold (YES in Op2), the tactile transmission driver causes the vibrator 4 to make expansion and contraction motions in the short-side direction of the touch panel 3 (Op3). Then, the vibrator 4, which are caused to make expansion and contraction motions in Op3, causes flexural vibration of the touch panel 3 in the vertical direction (Op4). As a result, a sense of pressing is transmitted to a user having pressed the first principal surface 3a of the touch panel 3. On the other hand, when determining that the pressing load detected in Op1 is less than the threshold (NO in Op2), the tactile transmission driver completes processing illustrated in FIG. 5.

From the above, the electronic device X1 described above can reduce a possibility of giving a sense of discomfort, such as glare, to a user, while makes it possible to achieve downsizing.

Next, a mobile terminal Y1 including the electronic device X1 will be described with reference to FIG. 6.

Figure 6:
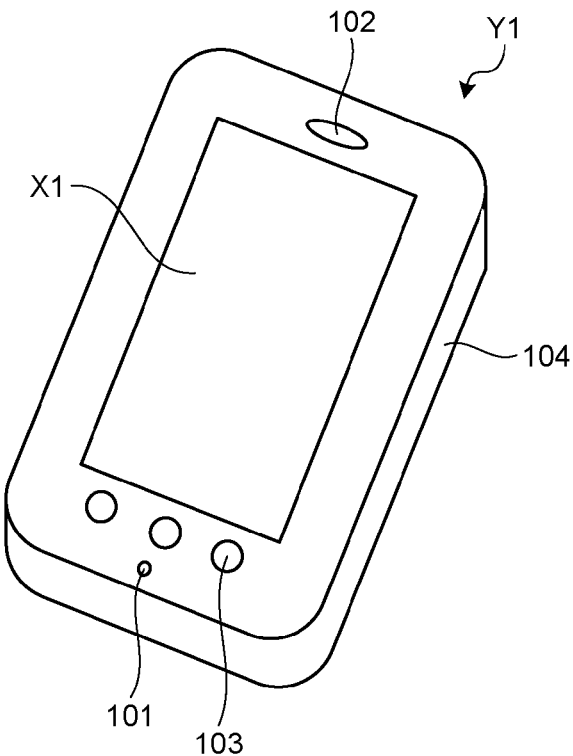
FIG. 6 is a perspective view illustrating a schematic configuration of a mobile terminal.

As illustrated in FIG. 6, the mobile terminal Y1 is, for example, a cellular phone, a smartphone, or a PDA, and includes the electronic device X1 described above, a voice input unit 101, a voice output unit 102, a key input unit 103, and a housing 104.

The voice input unit 101 is composed of a microphone or the like, and receives voice of a user or the like. The voice output unit 102 is composed of a speaker or the like, and outputs voice or the like received from a counterpart. The key input unit 103 is composed of a mechanical key, for example. Note that the key input unit 103 may be an operation key displayed on a display screen. The housing 104 is a member that serves to house the electronic device X1, the voice input unit 101, the voice output unit 102, and the key input unit 103.

In addition, the mobile terminal Y1 may include a digital camera function unit, a tuner for one-segment broadcasting, a short-distance wireless communication unit, such as an infrared communication function unit, and various interfaces, depending on a required function. However, detailed illustration and explanation thereof are omitted.

Since the mobile terminal Y1 includes the electronic device X1, the mobile terminal Y1 can reduce a possibility of giving a sense of discomfort, such as glare, to a user, while makes it possible to achieve downsizing.

Note that an example in which the mobile terminal Y1 includes the voice input unit 101 has been described above, but the present invention is not limited thereto. That is, the mobile terminal Y1 does not necessarily include the voice input unit 101.

Second Embodiment

Figure 7:
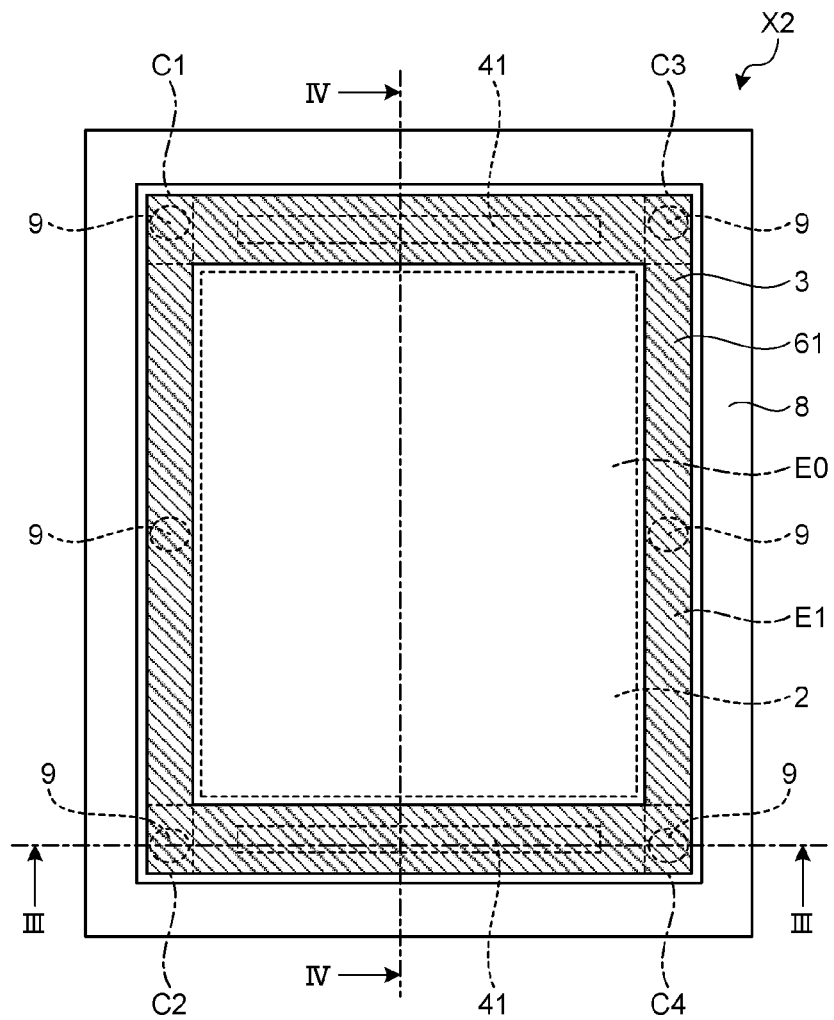
FIG. 7 is a plan view illustrating a schematic configuration of an electronic device according to a second embodiment of the present invention.
Figure 8:
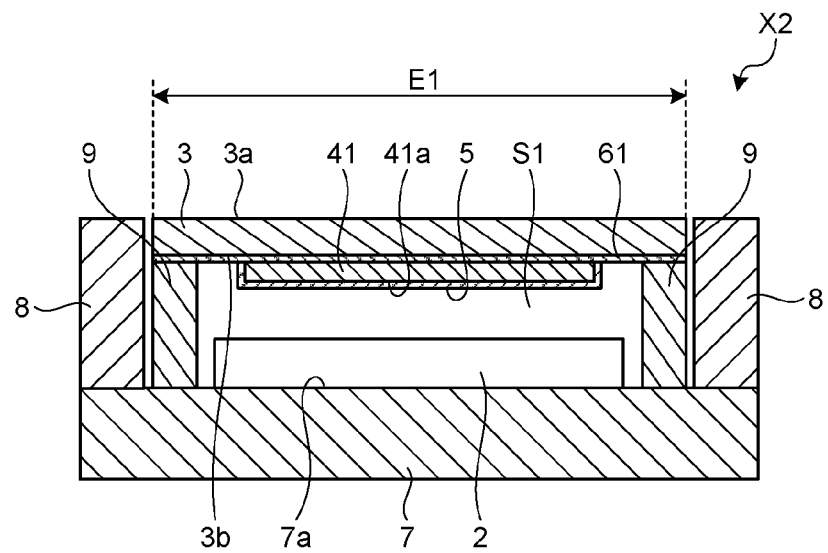
FIG. 8 is a schematic view taken along a cutting-plane line III-III illustrated in FIG. 7.
Figure 9:
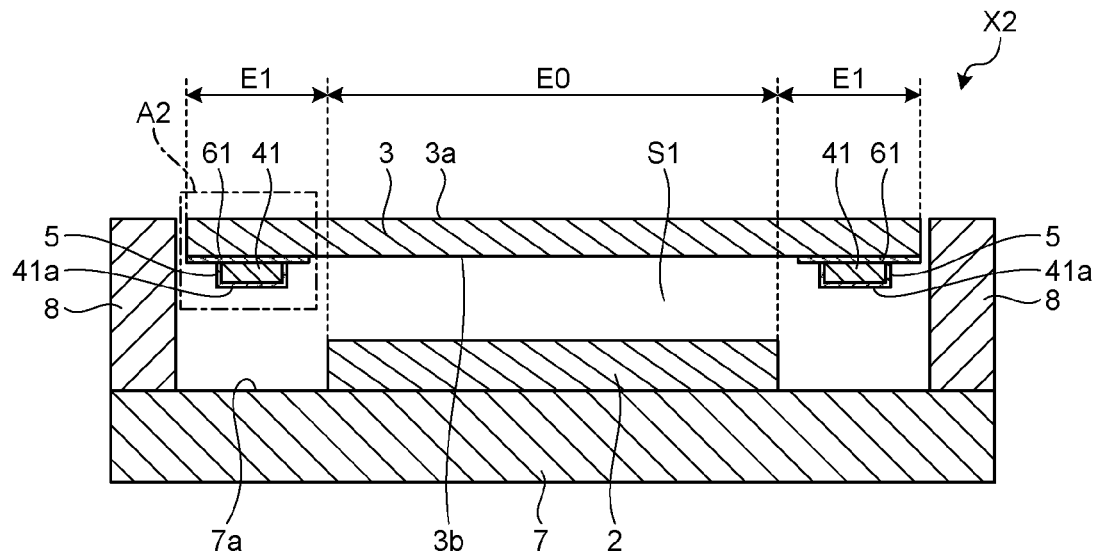
FIG. 9 is a sectional view taken along a cutting-plane line IV-IV illustrated in FIG. 7.
Figure 10:
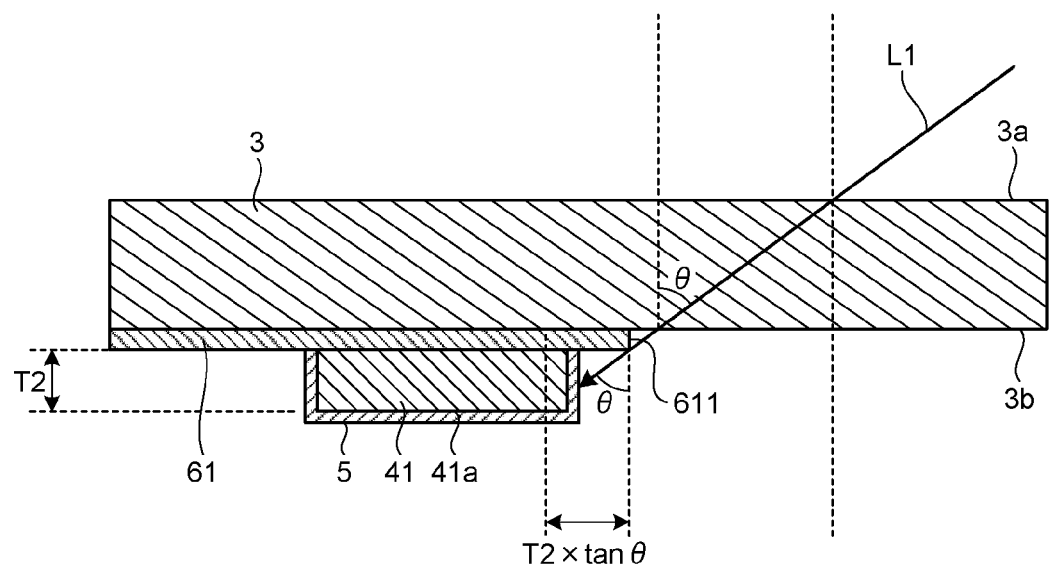
FIG. 10 is an enlarged view of a portion A2 illustrated in FIG. 9.

FIG. 7 is a plan view illustrating a schematic configuration of an electronic device X2 according to this embodiment. FIG. 8 is a sectional view taken along a cutting-plane line III-III illustrated in FIG. 7. FIG. 9 is a sectional view taken along a cutting-plane line IV-IV illustrated in FIG. 7. FIG. 10 is an enlarged view of a portion A2 illustrated in FIG. 9. Note that in FIGS. 7 to 10, components having the same functions as those illustrated in FIGS. 1 to 4 are denoted by the same reference numerals, and the detailed explanation thereof is omitted.

As illustrated in FIGS. 7 to 10, the electronic device X2 differs from the electronic device X1, in which the light shielding film 6 is provided on the first principal surface 3a of the touch panel 3 corresponding to the non-operation area E1, in that the light shielding film 61 is provided on the second principal surface 3b of the touch panel 3 corresponding to the non-operation area E1. Accordingly, in the electronic device X2, the vibrator 41 is provided on the light shielding film 61.

Now, a layout position of the vibrator 41 relative to the light shielding film 61 will be described. As illustrated in FIG. 10, assume that a critical angle at which light is totally reflected by the second principal surface 3b of the touch panel 3 is represented by θ and the thickness of the vibrator 41 is represented by T2.

If assuming that L1 in FIG. 10 represents a visual line direction (incident light) of a user, when the visual line direction L1 of the user corresponds to being equal to or greater than the critical angle θ, total reflection occurs at the second principal surface 3b of the touch panel 3. This makes it difficult to visually observe the vibrator 41 provided on the light shielding film 61. On the other hand, when the visual line direction L1 of the user corresponds to being less than the critical angle θ, the vibrator 41 provided on the light shielding film 61 is visually observed due to its layout position.

Specifically, when at least a part of the vibrator 41 is positioned within a range of T2×tan θ from an end 611 on the operation area E0 side of the light shielding film 61 on the second principal surface 3b of the touch panel 3 corresponding to the non-operation area E1, a user can visually observe the vibrator 41. When the vibrator 41 is visually observed by a user, there is a possibility that reflection of externally incident light by the surface 41a of the vibrator 41 gives a sense of discomfort, such as glare, to a user. On the other hand, when the vibrator 41 is located at a position apart by T2×tan θ or more from the end 611 on the operation area E0 side of the light shielding film 61 on the second principal surface 3b of the touch panel 3 corresponding to the non-operation area E1, a user cannot visually observe the vibrator 41.

Thus, to prevent a sense of discomfort, such as glare, from being given to a user, the vibrator 41 is desirably located at a position apart by T2×tan θ or more from the end 611 on the operation area E0 side of the light shielding film 61. In this mode, however, the non-operation area E1 of the electronic device X2 increases, which results in an increase in size in the lateral direction of the electronic device X2.

Accordingly, in the electronic device X2, at least a part of the vibrator 41 is positioned within the range of T2×tan θ from the end 611 on the side of the operation area E0 of the light shielding film 61, and the reflection-reducing film 5 having a reflectance lower than a reflectance of the surface 41a is provided on the surface 41a of the vibrator 41. With this configuration, in the reflection-reducing film 5, reflection of externally incident light is reduced, thereby making it possible to reduce a possibility of giving a sense of discomfort, such as glare, to the user.

Further, in the electronic device X2, the light shielding film 61 is provided on the second principal surface 3b of the touch panel 3 corresponding to the non-operation area E1. The vibrator 41 is provided on the light shielding film 61. Accordingly, in the electronic device X2, T2×tan θ can be made shoter than T×tan θ of the electronic device X1. In the electronic device X2, at least a part of the vibrator 41 is positioned within the range of T2×tan θ from the end 611 on the operation area E0 side of the light shielding film 61. Accordingly, in the electronic device X2, the non-operation area E1 can be made smaller than in the electronic device X1. As a result, in the electronic device X2, downsizing can be achieved as compared with the electronic device X1.

As described above, in the electronic device X2 described above, a possibility of giving a sense of discomfort, such as glare, to a user can be reduced, while making it possible to achieve downsizing.

Note that the light shielding film 61 described above preferably includes an adhesive member that bonds the vibrator 41 to the second principal surface 3b of the touch panel 3. Examples of material of the adhesive member include melamine resin, urea resin, phenolic resin, polyvinyl acetate resin, epoxy resin, cyanoacrylate resin, acrylic resin, polychloroprene rubber, and styrene-butadiene rubber. When the light shielding film 61 includes an adhesive member, it is possible to bond the vibrator 41 and the second principal surface 3b of the touch panel 3 without the need to provide an adhesive member separately from the light shielding film 51. In other words, the vibrator 41 and the second principal surface 3b of the touch panel 3 can be bonded to each other by the light shielding film 61 only through one process of forming the light shielding film 61, without the need to carry out two processes, i.e., a process of forming a light shielding film and a process of forming an adhesive member. That is, the light shielding film 61 preferably includes an adhesive member so as to reduce manufacturing processes.

Third Embodiment

Figure 11:
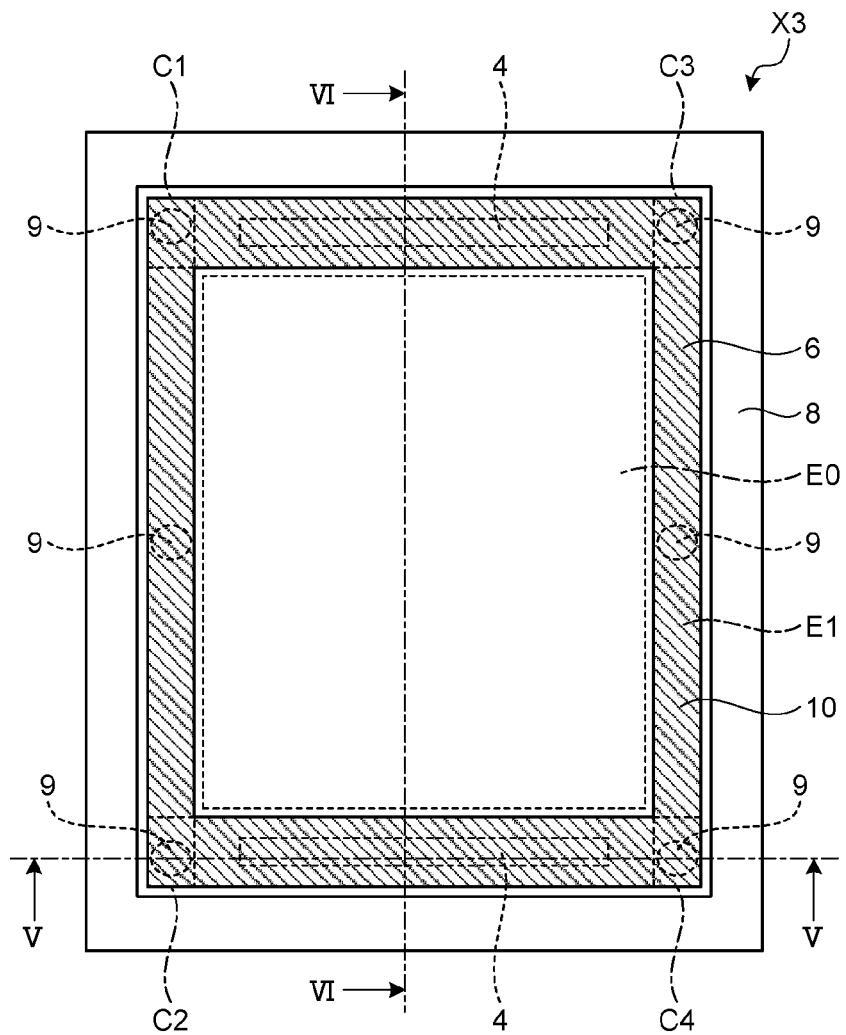
FIG. 11 is a plan view illustrating a schematic configuration of an electronic device according to a third embodiment of the present invention.
Figure 12:
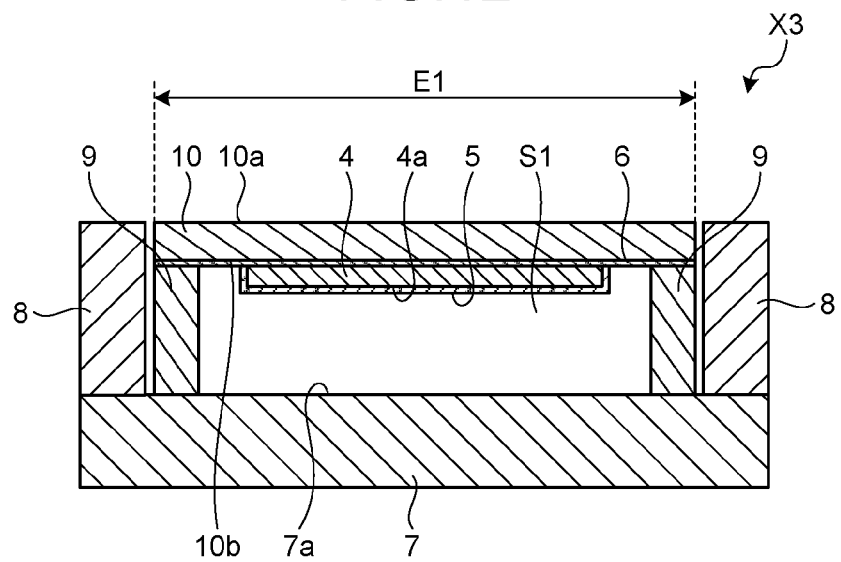
FIG. 12 is a sectional view taken along a cutting-plane line V-V illustrated in FIG. 11.
Figure 13:
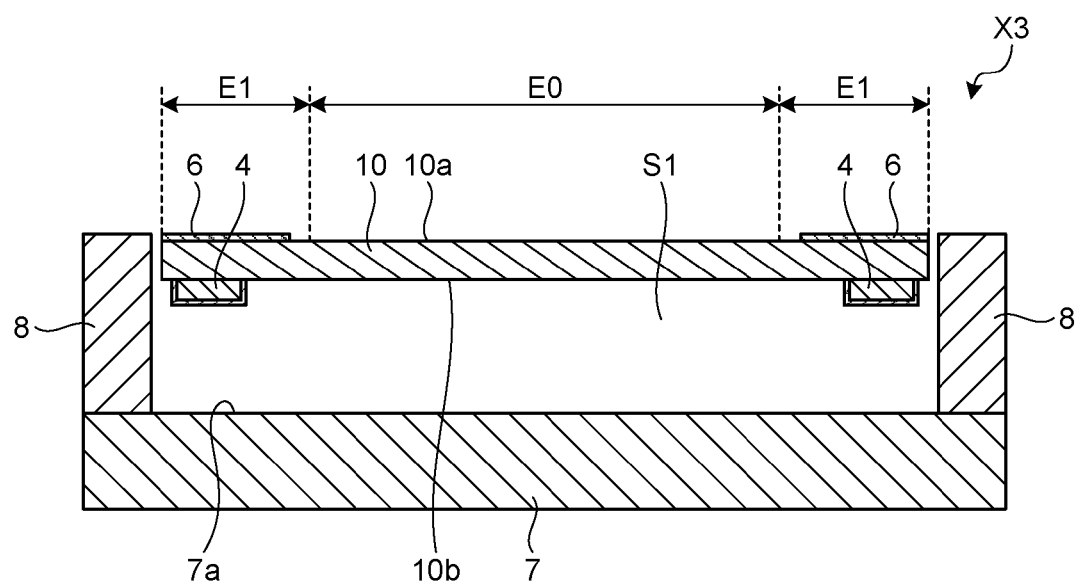
FIG. 13 is a sectional view taken along a cutting-plane line VI-VI illustrated in FIG. 11.

FIG. 11 is a plan view illustrating a schematic configuration of an electronic device X3 according to this embodiment. FIG. 12 is a sectional view taken along a cutting-plane line V-V illustrated in FIG. 11. FIG. 13 is a sectional view taken along a cutting-plane line VI-VI illustrated in FIG. 11. In FIGS. 11 to 13, components having the same functions as those illustrated in FIGS. 1 to 3 are denoted by the same reference numerals, and the detailed explanation thereof is omitted.

As illustrated in FIGS. 11 to 13, in the electronic device X3, a liquid crystal panel 10 having a function of detecting an input position is provided instead of the liquid crystal panel 2 and the touch panel 3 which are described in the first embodiment.

The liquid crystal panel 10 is disposed to be opposed to the third principal surface 7a of the base substance 7 with the space 51 interposed therebetween. The liquid crystal panel 10 is supported by the base 9, which is provided on the third principal surface 7a of the base substance 7, at the non-operation area E1. The liquid crystal panel 10 includes a first principal surface 10a and a second principal surface 10b positioned opposite to the first principal surface 10a.

The liquid crystal panel 10 includes one substrate; the other substrate disposed to be opposed to the one substrate; a liquid crystal layer interposed between the one substrate and the other substrate; a display member layer that is interposed between the one substrate and the other substrate and contributes to display; and a photodetection unit provided on the one substrate. This photodetection unit corresponds to the function of detecting an input position. When a finger is placed on the liquid crystal panel 10 in a state where external light is incident on a photodetection unit, the external light incident on a photodetection unit positioned corresponding to this finger is blocked. Accordingly, in the liquid crystal panel 10, an input position can be detected through comparison of a detection level of a photodetection unit on which the external light is incident and a detection level of a photodetection unit on which no external light is incident.

Note that an example of the liquid crystal panel including the photodetection unit has been described above as the liquid crystal panel 10 having the function of detecting an input position, but the liquid crystal panel is not limited thereto. For example, a liquid crystal panel in which a detection electrode of a capacitive touch panel is directly formed on the other substrate of the liquid crystal panel 10 may be used as the liquid crystal panel 10 having the function of detecting an input position.

Further, an example of the liquid crystal panel 10 having the function of detecting an input position has been described above, but the present invention is not limited thereto. A display panel, such as a plasma panel, an organic EL panel, or electronic paper having the function of detecting an input position may be used instead of the liquid crystal panel 10.

Furthermore, an example of the mobile terminal Y1 including the electronic device X1 has been described above. However, one of the electronic devices X2 and X3 may be employed instead of the electronic device X1. A mobile terminal including one of the electronic devices X2 and X3 may be employed. The embodiments described above may be combined as needed.

Moreover, an example in which the electronic devices X1 to X3 are applied to the tactile transmission technique have been described above, but the present invention is not limited thereto. The electronic devices X1 to X3 are applicable not only to the tactile transmission technique, but also to a technique of a panel speaker which outputs voice, or a technique that makes it possible to hear sound using by bone conduction, for example.

REFERENCE SIGNS LIST

X1-X3 ELECTRONIC DEVICE
Y1 MOBILE TERMINAL
2 LIQUID CRYSTAL PANEL (DISPLAY PANEL)
3 TOUCH PANEL (OPERATION UNIT)
4, 41 VIBRATOR
5 REFLECTION-REDUCING FILM
6, 61 LIGHT SHIELDING FILM
7 BASE SUBSTANCE
9 BASE
10 LIQUID CRYSTAL PANEL (OPERATION UNIT, DISPLAY PANEL)
104 HOUSING
E0 OPERATION AREA
E1 NON-OPERATION AREA

What is claimed is:

1. An electronic device including an operation area and a non-operation area positioned outside the operation area, the electronic device comprising:

an operation unit including a first principal surface and a second principal surface positioned opposite to the first principal surface, wherein the first principal surface is an initial ambient light surface;

a light shielding film formed on the first principal surface of the operation unit corresponding to the non-operation area; and a vibrator provided on the second principal surface of the operation unit corresponding to the non-operation area, wherein when a critical angle at which light is totally reflected by the second principal surface of the operation unit is represented by $\theta$ and sum of a thickness T1 of the operation unit and a thickness T2 of the vibrator is represented by T, wherein at least part of the vibrator is positioned, in sectional view, within a range of T×tan $\theta$ from an end on the operation area side of the light shielding film on the second principal surface of the operation unit corresponding to the non-operation area, and a reflection-reducing film having a reflectance lower than a reflectance of a surface of the vibrator is provided on the surface of the vibrator positioned within the range of T×tan $\theta$ from the end on the operation area side of the light shielding film.

2. A mobile terminal comprising an electronic device according to claim 1, and a housing in which the electronic device is provided.

3. The electronic device according to claim 1, wherein
the operation unit is a touch panel, and
the electronic device includes:
    a base substance having a third principal surface;
    a base that is provided on the third principal surface of the base substance, and supports the operation unit at the non-operation area; and
    a display panel that is provided on or above the third principal surface of the base substance, and is disposed to be opposed to the operation unit with a space interposed therebetween.

4. The electronic device according to claim 3, wherein the display panel is one selected from a group consisting of a liquid crystal panel and an organic EL panel.

5. The electronic device according to claim 1, wherein
the operation unit is a display panel having a function of detecting an input position, and
the electronic device further includes:
    a base substance having a third principal surface; and
    a base that is provided on the third principal surface of the base substance, and supports the operation unit at the non-operation area.

6. A mobile terminal comprising an electronic device according to claim 5, and a housing in which the electronic device is provided.

7. An electronic device including an operation area and a non-operation area positioned outside the operation area, the electronic device comprising:
    an operation unit including a first principal surface and a second principal surface positioned opposite to the first principal surface, wherein the first principal surface is an initial ambient light surface;
    a light shielding film formed on the second principal surface of the operation unit corresponding to the non-operation area; and
    a vibrator provided on the light shielding film,
    wherein when a critical angle at which light is totally reflected by the second principal surface of the operation unit is represented by $\theta$ and a thickness of the vibrator is represented by T2,
    wherein at least part of the vibrator is positioned, in sectional view, within a range of T2×tan $\theta$ from an end on the operation area side of the light shielding film on the light shielding film, and
    a reflection-reducing film having a reflectance lower than a reflectance of a surface of the vibrator is provided on the surface of the vibrator positioned within the range of T2×tan $\theta$ from the end on the operation area side of the light shielding film.

8. The electronic device according to claim 7, wherein the light shielding film includes an adhesive member that bonds the vibrator to the second principal surface of the operation unit.

9. A mobile terminal comprising an electronic device according to claim 7, and a housing in which the electronic device is provided.

10. The electronic device according to claim 7, wherein
the operation unit is a touch panel, and
the electronic device includes:
    a base substance having a third principal surface;
    a base that is provided on the third principal surface of the base substance, and supports the operation unit at the non-operation area; and
    a display panel that is provided on or above the third principal surface of the base substance, and is disposed to be opposed to the operation unit with a space interposed therebetween.

11. The electronic device according to claim 10, wherein the display panel is one selected from a group consisting of a liquid crystal panel and an organic EL panel.

12. The electronic device according to claim 7, wherein
the operation unit is a display panel having a function of detecting an input position, and
the electronic device further includes:
    a base substance having a third principal surface; and
    a base that is provided on the third principal surface of the base substance, and supports the operation unit at the non-operation area.

13. The electronic device according to claim 12, wherein the display panel is one selected from a group consisting of a liquid crystal panel and an organic EL panel.

* * * * *